(12) United States Patent
Lei

(10) Patent No.: US 7,107,236 B2
(45) Date of Patent: Sep. 12, 2006

(54) SELF-CONTAINED BUSINESS TRANSACTION CAPSULES

(75) Inventor: Jonathan L. Lei, Los Angeles, CA (US)

(73) Assignee: ★Roaming Messenger, Inc., Santa Barbara, CA (US)

( * ) Notice: Subject to any disclaimer, the term of this patent is extended or adjusted under 35 U.S.C. 154(b) by 307 days.

(21) Appl. No.: 09/753,093

(22) Filed: Jan. 2, 2001

(65) Prior Publication Data

US 2003/0110097 A1 Jun. 12, 2003

(51) Int. Cl.
*G06Q 30/00* (2006.01)

(52) U.S. Cl. .............................. 705/27; 705/26; 705/51

(58) Field of Classification Search .................. 705/26, 705/27, 41, 65, 51; 235/375–380, 472.01, 235/472.02, 472.03; 707/201
See application file for complete search history.

(56) References Cited

U.S. PATENT DOCUMENTS

| | | | | | |
|---|---|---|---|---|---|
| 4,277,837 | A | * | 7/1981 | Stuckert | 235/380 |
| 4,900,903 | A | * | 2/1990 | Wright et al. | 235/380 |
| 4,926,325 | A | * | 5/1990 | Benton et al. | 705/39 |
| 5,159,182 | A | * | 10/1992 | Eisele | 235/492 |
| 5,321,817 | A | * | 6/1994 | Feinstein | 703/25 |
| 5,410,326 | A | * | 4/1995 | Goldstein | 348/734 |
| 5,530,438 | A | * | 6/1996 | Bickham et al. | 340/5.8 |
| 5,629,981 | A | * | 5/1997 | Nerlikar | 713/168 |
| 5,664,228 | A | * | 9/1997 | Mital | 710/62 |
| 5,708,782 | A | * | 1/1998 | Larson et al. | 705/14 |
| 5,758,328 | A | * | 5/1998 | Giovannoli | 705/26 |
| 5,797,085 | A | * | 8/1998 | Beuk et al. | 455/88 |
| 5,814,798 | A | * | 9/1998 | Zancho | 235/380 |
| 5,842,178 | A | * | 11/1998 | Giovannoli | 705/26 |
| 5,845,077 | A | * | 12/1998 | Fawcett | 709/221 |
| 5,845,282 | A | * | 12/1998 | Alley et al. | 707/10 |
| 5,890,135 | A | * | 3/1999 | Powell | 705/14 |
| 5,892,900 | A | * | 4/1999 | Ginter et al. | 726/26 |
| 5,905,245 | A | * | 5/1999 | Tanaka | 235/375 |
| 5,942,738 | A | * | 8/1999 | Cesaire et al. | 235/380 |
| 6,047,261 | A | * | 4/2000 | Siefert | 705/11 |
| 6,055,513 | A | * | 4/2000 | Katz et al. | 705/26 |
| 6,061,057 | A | * | 5/2000 | Knowlton et al. | 715/744 |
| RE36,788 | E | * | 7/2000 | Mansvelt et al. | 235/379 |
| 6,101,485 | A | | 8/2000 | Fortenberry et al. | |
| 6,134,548 | A | * | 10/2000 | Gottsman et al. | 707/5 |
| 6,199,753 | B1 | * | 3/2001 | Tracy et al. | 235/375 |
| 6,227,972 | B1 | * | 5/2001 | Walker et al. | 463/25 |
| 6,385,591 | B1 | * | 5/2002 | Mankoff | 705/14 |
| 6,430,576 | B1 | * | 8/2002 | Gates et al. | 707/201 |
| 6,442,532 | B1 | * | 8/2002 | Kawan | 705/36 R |
| 6,463,534 | B1 | * | 10/2002 | Geiger et al. | 713/168 |

(Continued)

FOREIGN PATENT DOCUMENTS

GB  EP 953946  * 11/1999

(Continued)

OTHER PUBLICATIONS

Amazon.com, www.Amazon.com, Nov. 27, 1999, pp. 1-9.*

(Continued)

*Primary Examiner*—Jeffrey A. Smith
*Assistant Examiner*—Carlos Lugo
(74) *Attorney, Agent, or Firm*—Pillsbury Winthrop Shaw Pittman LLP

(57) ABSTRACT

A self-contained business transaction capsule to conduct a wireless transaction includes data regarding the wireless transaction. Transaction logic is provided to complete the wireless transaction. The self-contained business transaction capsule is adapted to be broadcasted to and stored on a portable electronic device.

35 Claims, 7 Drawing Sheets

U.S. PATENT DOCUMENTS

| | | | |
|---|---|---|---|
| 6,512,919 B1 * | 1/2003 | Ogasawara | 455/422.1 |
| 6,535,913 B1 * | 3/2003 | Mittal et al. | 709/219 |
| 6,577,861 B1 * | 6/2003 | Ogasawara | 455/419 |
| 6,615,179 B1 * | 9/2003 | McNicol et al. | 705/1 |
| 6,799,035 B1 * | 9/2004 | Cousins | 455/418 |
| 6,862,575 B1 * | 3/2005 | Anttila et al. | 705/14 |
| 2003/0050854 A1 * | 3/2003 | Showghi et al. | 705/26 |

FOREIGN PATENT DOCUMENTS

| | | | |
|---|---|---|---|
| US | EP 360613 | * | 3/1990 |
| WO | WO 9736265 | * | 10/1997 |
| WO | WO 0154088 | * | 7/2001 |

OTHER PUBLICATIONS

Bluetooth.com, www.bluetooth.com, Nov. 17, 1999, pp. 1 and 2.*

E-Commerce Times, "Amazon and Sprint debut wireless net shopping", Dec. 8, 1999, pp. 1-4.*

E-Commerce Times, "Amazon and Sprint expand wireless shopping", Feb. 28, 2000, pp. 1-3.*

Symbian, "Celesta Smart Forms enables mobile business solutions on the Sybian platform", Feb. 24, 2000.*

Looksmart, "Cutting Edge Software Aims to Empower the Mobile Enterprise Via Quicksheet Commercial Solutions Pack", May 8. 2000.*

Yahoo! Launches Mobile Commerce Services, Oct. 19, 2000.*

CNET News.Com "Palm looks to add wireless to all services", Apr. 14, 2000.*

Wireless Payments Systems, May 14, 2000.*

Internet Archive.*

C/Nent News.com, Stephen Shankland, "Intelligent Software fueled by Java", May 12, 2000, pp. 1 and 2.*

Palm.com, "3Com give wire-free connection between Palm computing devices and mobile phones", Nov. 6, 1998, pp. 1-3.*

Quickoffice.com, Feb. 2, 2001, pp. 1 and 2.*

Tryllian.com, Jun. 8, 2000, pp. 1 and 2.*

Tryllian Co., "Tryllian Mobile Agents: Going beyond the web", May 2000, pp. 1-21.*

\* cited by examiner

ND BUSINESS
SELF-CONTAINED BUSINESS TRANSACTION CAPSULES

BACKGROUND OF THE INVENTION

1. Field of the Invention

The present invention generally relates to a system and method of conducting business transactions. More specifically, the present invention relates to a self-contained business transaction capsule that contains all the data and logic necessary to complete a transaction, particularly utilizing wireless devices.

2. Discussion of the Related Art

The Internet has profoundly impacted traditional methods of commerce. Internet commerce, or electronic commerce ("e-commerce"), continues to grow each year. A clear majority of Americans are expected to be online by the year 2003. It is also expected that there will be 502 million Internet users worldwide by the year 2003. By eliminating many of the costs involved in executing routine commercial transactions, such as simple banking services and retail purchases, the Internet is rapidly providing individuals and organizations with a new medium for conducting business. And, as a source of consumer information on products and services, the Internet is unparalleled. Consumers can easily gather and compare information on products and services by visiting Web sites on the Internet. In addition to the basic information of a product or service provided on a Web site, sounds and images may also be provided therewith. Therefore, with an Internet Web site, a consumer can learn more about a product or service than over the telephone, and can more easily compare benefits and prices with competitors. Accordingly, these new digital marketplaces allow participants to conduct transactions at any time from any place. In these "e-marketplaces", customers are drawn or "pulled" to Web sites or virtual stores, much like "window shoppers" are lured into brick-and-mortar retail stores.

As the Internet becomes more and more dominant, e-marketplaces will exist in wireless access networks, portal Web sites, interactive advertisements, cable access networks, telephone access networks, industrial trading hubs, auctioning systems, airplanes, kiosks, and geographically-local marketplaces to serve as additional outlets for the sale of products and services in the form of e-commerce transactions. To be successful in these new e-marketplaces, it is desirable for online businesses to "push" their products out into these new channels of distribution, rather than just simply "pulling" customers to their Web sites.

Wireless devices are expected to become extremely important conduits of online transactions for both "push" and "pull" commerce, even though they collectively lack a standard to communicate with the Internet. Existing "native e-commerce" systems are not readily compatible with the new digital marketplace, particularly with wireless devices. For example, a wireless user could not easily place an order for a specific product on a Web site that expects interactivity from a standard Web browser connection due to the limitations of wireless devices. Some of these limitations include the lack of transmission standards, low bandwidths, small displays, limited buttons for user input, unstable wireless connections, etc. Therefore, in order to conduct wireless mobile commerce, or "m-commerce", an online business would be required to develop a customized solution that makes the online business's native e-commerce system compatible with wireless devices.

DETAILED DESCRIPTION

Figure 2:
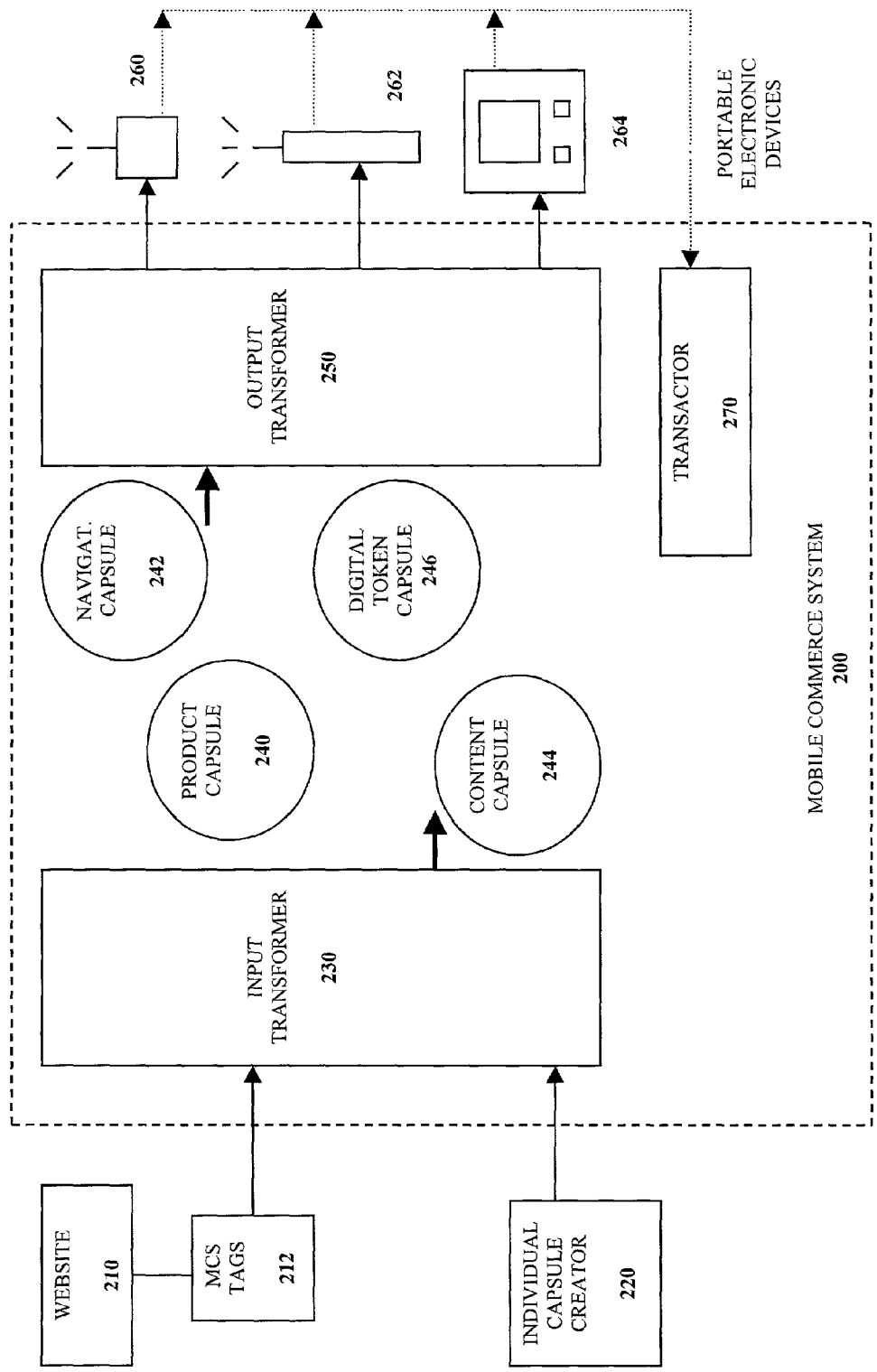
FIG. 2 illustrates a mobile commerce system for generating self-contained business transaction capsules according to an embodiment of the present invention.

FIG. 2 illustrates a mobile commerce system for generating self-contained business transaction capsules according to an embodiment of the present invention. A self-contained business transaction capsule 240, 242, 244, 246 ("eCapsule") is a small electronic capsule that contains all the necessary data and logic to complete a business transaction. The eCapsule 240, 242, 244, 246 is preferably a "thin" and "lightweight" small computer-readable file that is device independent. The eCapsule 240, 242, 244, 246 allows an online merchant, for example, to encapsulate an individual product or service into an intelligent object that is capable of completing entire transactions. The eCapsule 240, 242, 244, 246 includes data about the product or service being provided, such as the price, image, and a textual description of the product or service (a transaction description). The eCapsule 240, 242, 244, 246 also includes transaction logic or business logic capable of completing the transaction, such as billing and shipping information, order routing information, order status information, shipping status information, and any other transaction rules necessary to process the transaction. Moreover, the eCapsule 240, 242, 244, 246 is adapted to be broadcasted to, and stored on, a portable electronic device 260, 262, 264, such as a mobile wireless-enabled device, like a cellular telephone, a personal digital assistant (PDA), a laptop computer, etc.

FIG. 2 illustrates examples of four different self-contained business transaction capsules 240, 242, 244, 246. However, many other configurations may be utilized, though. A "product" self-contained business transaction capsule 240 represents conventional tangible products, such as a cheesecake or a watch. Accordingly, the product eCapsule 240 would contain data about the product being offered, such as a textual description, the price, or even images of the product. Transaction logic would also be included, such as the shipping information, obtaining payment information, price and sales tax calculations, etc. Once all the data regarding ordering of a product is obtained by the user and processed utilizing the transaction logic at the portable electronic device 260, 262, 264, completed transaction data may be transmitted from the portable electronic device 260, 262, 264 to a transaction system, preferably a mobile commerce system 200, to finalize and complete the transaction.

A "navigation" self-contained business transaction capsule 242 represents a "site map" as in a conventional Internet Web site. That is, the navigation eCapsule 242 contains a little menu of many other self-contained business transaction capsules 240, 242, 244, 246 that a user can scroll through. The navigation eCapsule 242 provides a solution to display the available self-contained business transaction capsules 240, 242, 244, 246 on a limited display area, as common in wireless portable electronic devices 260, 262, 264. Therefore, the navigation eCapsule 242 may be divided into many levels or categories, much like a file system directory or tree, to allow a user to locate a desired self-contained business transaction capsule 240, 242, 244, 246. The navigation eCapsule 242 includes data about the available self-contained business transaction capsules 240, 242, 244, 246, and includes transaction logic to allow the user to browse through the list and to request a selected self-contained business transaction capsule 240, 242, 244, 246 to be broadcasted to the user's portable electronic device 260, 262, 264.

A "content" self-contained business transaction capsule 244 is one that contains media content, for example, like a Wall Street Journal report, a news article, etc. The data within the content eCapsule 244 would contain the content being displayed to a user, and the transaction logic would allow the user to scroll through the content, to order another content eCapsule 244 of a related story, etc.

A "digital token" self-contained business transaction capsule 246 represents "redeemable" type transactions, such as an airline ticket, a dinner reservation, a coupon, or even electronic/digital cash. The digital token eCapsule 246 may include data about an airline ticket, such as the flight time, flight number, departure time, and transaction logic to enable the user to "check-in" to the flight, pay for the flight, cancel the flight, etc.

Referring to FIG. 2, an input transformer 230, preferably provided within the mobile commerce system 200, creates the self-contained business transaction capsules 240, 242, 244, 246. The input transformer 230 may be a software application, used in conjunction with the hardware of the mobile commerce system 200, and may be comprised of a single or multiple computer systems, that is adapted to create the eCapsules 240, 242, 244, 246. The input transformer may be a dedicated hardware component as well, such as firmware. The input transformer 230 receives the necessary data regarding a particular product or service, and encapsulates the data with transaction logic so as to create a particular eCapsule 240, 242, 244, 246. Transaction logic may also include references to user profiles and merchant business objects stored on the mobile commerce system 200, so that if a user is a repeat user of the mobile commerce system 200, billing and shipping information, for example, would already be available and there would be no need to provide this information again.

Two basic ways of providing the data to the input transformer 230 and creating self-contained business transaction capsules 240, 242, 244, 246 include: (1) manual input transformation, and (2) automatic input transformation. With manual input transformation, a user interface is preferably provided to allow a business to manually create the eCapsules 240, 242, 244, 246 by defining properties and providing the pertinent transaction logic and product/service information. That is, the necessary data regarding the product and the transaction logic are manually entered by an individual capsule creator 220 for each product or service for which eCapsules 240, 242, 244, 246 are to be created. For example, the user interface may be provided over a network connection, such as the Internet, utilizing a Web browser software application, such as Netscape Navigator, Microsoft Internet Explorer, or a native application running on operating systems such as Microsoft Windows, Mac OS, UNIX, etc., to allow the creator 220 to input the data into the input transformer 230. Once all the necessary data and transaction logic for a product or service have been entered, the input transformer 230 can create the eCapsule for that particular product or service. Manual input transformation is adequate for small businesses, and particularly ones that do not have an Internet Web site. However, for large businesses offering many products and/or services, manual input transformation can be a costly, inefficient, and time consuming process.

Automatic input transformation may be utilized by the input transformer 230 to automatically extract the data regarding a product or service to be provided and the transaction logic from, for example, an existing Internet Web site 210 of the business offering the product or service. Other data sources that the input transformer 230 may extract data from may include an Extensible Markup Language file (XML) from an enterprise system, or any other data source other than a Web site. That is, for a business having an existing Internet Web site 210 offering a product or service to the consumer, markup tags (e.g., mobile commerce system (MCS) markup tags, XML tags, etc.) 212 may be pre-defined and made available to the business so that they could "tag" their Internet Web site page(s) 210 with these markup tags 212. Once the Web site page(s) 210 offering the products or services have been tagged with these pre-defined markup tags 212, the input transformer 230 may be configured so as to retrieve the relevant Web pages 210 over the Internet and extract the information pointed by the markup tags 212 from these Web page(s) 210 so as to obtain the data and transaction logic necessary to create a self-contained business transaction capsule 240, 242, 244, 246 for each product or service being provided. By utilizing automatic input transformation, the creation of eCapsules 240, 242, 244, 246 becomes transparent, as all the information required to create the eCapsules 240, 242, 244, 246 is obtained directly from the Web pages 210 of the business. Therefore, any changes to the products or services provided (such as adding a product or service, lowering the price, change in shipping charges, change in shipping methods, etc.) made to the Web site 210 are automatically detected by the input transformer 230, and new eCapsules may be automatically generated (with the old ones deleted) and/or updated and changed as necessary, depending directly on the changes made to the Internet Web site pages 210 by the business.

The input transformer 230 may be configured so as to visit and retrieve the Web pages of a business at specific intervals (e.g., every hour), and analyze the Web page code, for example, written in hypertext markup language (HTML), to determine whether any changes have occurred so as to determine whether to add, delete, or update a self-contained business transaction capsule 240, 242, 244, 246 for a product or service. Markup tags 212 in the Web page code direct the input transformer 230 to relevant data and transaction logic required to create an eCapsule 240, 242, 244, 246. Accordingly, all the necessary data and transaction logic required to create an eCapsule 240, 242, 244, 246 may be embedded within a business's existing Internet Web site 210 to facilitate the automatic input transformation process by the input transformer 230. Some transaction logic information may be pre-defined and provided directly to the input transformer 230, as some transaction logic information do not vary from product to product (or service to service). Therefore, the business or online merchant need only update their Web site in order to update, add, or change an eCapsule 240, 242, 244, 246 for a particular product or service.

An output transformer 250, preferably provided within the mobile commerce system 200, receives the self-contained business transaction capsules 240, 242, 244, 246 generated by the input transformer 230 and broadcasts them via any number of suitable channels of distribution. The output transformer 250 may be a software application, used in conjunction with the necessary hardware, such as a wireless transmitter (e.g., radio transmitter, cellular transmitter, satellite transmitter, infrared transmitter, etc.), to broadcast the eCapsules 240, 242, 244, 246. The output transformer 250 may be a dedicated hardware component as well, such as firmware. The transmitter(s) need not necessarily be integrated with the mobile commerce system 200, but may be connected downstream via a network or a direct connection. The output transformer 250 may also provide the eCapsules 240, 242, 244, 246 to several transmitters at a time, which ultimately broadcast the eCapsules 240, 242, 244, 246 to the portable electronic devices 260, 262, 264. Some examples of output transformers may include: (1) Wireless Application Protocol (WAP) transformers, to transform the eCapsules 240, 242, 244, 246 for broadcast in the WAP protocol; (2) Palm Operating System (OS) transformers, to transform the eCapsules 240, 242, 244, 246 for use with the Palm personal digital assistants (PDAs); and (3) banner advertisement transformers, to create banner advertisements for the eCapsules 240, 242, 244, 246, on, for example, a Web site. For example, if the portable electronic device 260, 262, 264 is a cellular telephone utilizing the WAP protocol, then the output transformer 250 is adapted to transmit the eCapsules 240, 242, 244, 246 over a cellular transmitter utilizing a cellular signal to the cellular telephone.

As mentioned above, the portable electronic device 260, 262, 264 is preferably a mobile wireless-enabled device, such as a cellular telephone, a PDA having wireless transmission capabilities, or a laptop computer having wireless transmission capabilities. The portable electronic device 260, 262, 264 preferably includes a microprocessor and memory storage (such as semiconductor memory, hard disk, optical disk, magnetic disk, etc.) to process and store the self-contained business transaction capsules 240, 242, 244, 246. Accordingly, once the eCapsules 240, 242, 244, 246 have been broadcasted to the portable electronic device 260, 262, 264 and stored therein, each of the eCapsules 240, 242, 244, 246 is adapted to complete an entire transaction by responding to a user's input and commands.

Once the user has inputted the required information on the portable electronic device 260, 262, 264 to complete a transaction, the transaction logic of the self-contained business transaction capsule 240, 242, 244, 246 is adapted to perform any necessary data processing on the portable electronic device 260, 262, 264 and transmit completed transaction data, preferably back to the mobile commerce system 200 to complete the transaction. For example, the portable electronic device 260, 262, 264 may transmit completed transaction data via a cellular transmitter utilizing the WAP protocol back to the mobile commerce system 200 over a cellular signal.

A transactor 270 is preferably provided within the mobile commerce system 200 to receive completed transaction data from the portable electronic device 260, 262, 264 and handle all the transaction requirements of the self-contained business transaction capsules 240, 242, 244, 246. The transactor 270 is adapted to communicate with the eCapsule during the transaction cycle. Some of the transaction requirements may include payment processing and order routing tasks, so as to complete the transaction with the user in real time. The transactor 270 may also perform ticket redemption, device authentication, user authentication, invalidation of lost eCapsules, delivery of "contents" in eCapsules, etc. The transactor 270 may be a software application executing on a computer system within the mobile commerce system 200. The transactor 270 have be a dedicated hardware component as well, such as firmware. By providing a dedicated transactor 270, the transaction requirements needed to complete a transaction with the user are handled more quickly and efficiently. The transactor 270 provides a liaison between the mobile commerce system 200 and the business providing the products or services. The transactor 270 is adapted to provide the necessary completed transaction information back to the business so that the proper product may be shipped out to the correct address, the service ordered can be provided, or the payment information is processed (e.g., debiting the credit card), etc.

The mobile commerce system 200 is preferably a host server computer system, which in itself may be comprised of a single computer system or several computer systems. The input transformer 230, the output transformer 250, and the transaction 270, may also be each comprised of more than one computer system as well. A company or organization that manages the mobile commerce system 200 may utilize the Application Service Provider (ASP) Web-based hosting approach. Application Service Providers are third-party entities that manage and distribute software-based services and solutions to customers across a wide area network from a central data center. In essence, ASPs are a way for companies to outsource some or almost all aspects of their information technology needs.

Besides performing the primary duties of creating self-contained business transaction capsules 240, 242, 244, 246 and broadcasting them, the mobile commerce system 200 may have software applications to perform other business and transaction services. With respect to business services, the software application may include: instructions to personalize an interface for the user to obtain preferred eCapsules; instructions to serve a "light" version of an Internet Web site (and Web site map) better suited for display on a portable electronic device 260, 262, 264; instructions to sense the type of portable electronic device 260, 262, 264 (and operating system) utilized by a user; instructions to track the physical location of a user (e.g., by utilizing built-in global positioning system (GPS) of a portable electronic device 260, 262, 264); instructions to report data to the businesses regarding the transactions (such as orders, reservations, etc.); instructions to provide event triggering so as to broadcast an eCapsule when a pre-defined event occurs (e.g., receipt of a news message, a particular time, etc.); instructions to store a user's profile (e.g., name, address, contact information, favorite topics, past ordered products or services, etc.); and instructions to broadcast the eCapsules.

With respect to the transaction services, the software application (which may be entirely resident on the transactor 270 or distributed across a single or several systems within the mobile commerce system 200) may include: instructions to receive payment information; instructions to place an order; instructions to redeem tokens or discount coupons; instructions to provide access to content being ordered; instructions to invalidate self-contained business transaction capsules (in case the portable electronic device is lost, stolen, etc.); and instructions to transmit the eCapsules.

Figure 6:
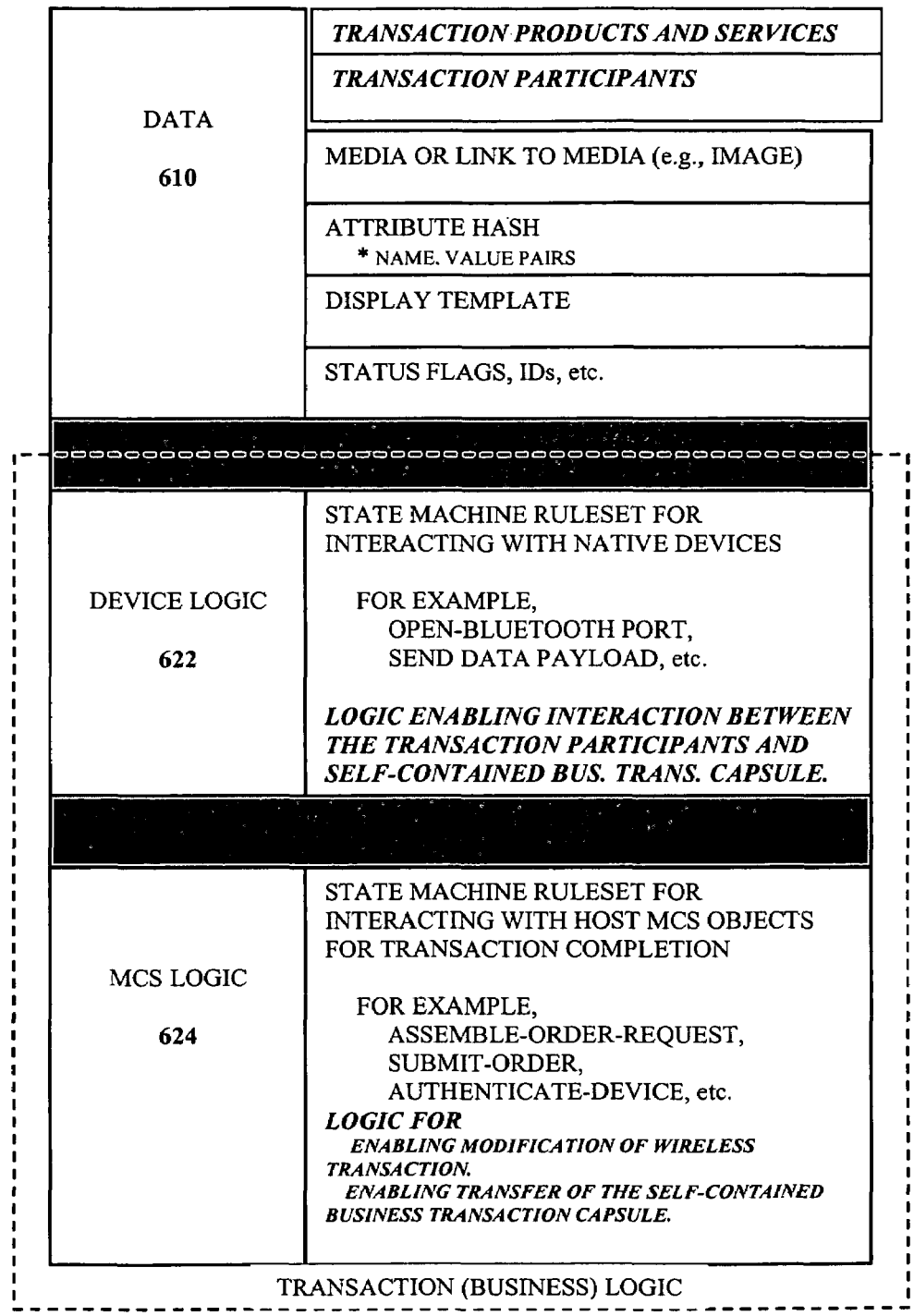
FIG. 6 illustrates a self-contained business transaction capsule according to an embodiment of the present invention.

FIG. 6 illustrates a self-contained business transaction capsule according to an embodiment of the present invention. As mentioned above, the self-contained business transaction capsule 600 preferably includes a data portion 610 and a transaction logic portion 620. The data portion 610 includes information about the transaction, such as the product or service being provided, including the price, an image, or a textual description of the product or service (a transaction description). Rather than including a complete image, a link to an image may be provided instead, so as to keep the eCapsule 600 as small as possible. Other information that may be included in the data portion 610 may be a name/title of the eCapsule 600, a display template so as to present the information to the user in a particular format, and status flags or identification values to identify the eCapsule.

The transaction logic 620 preferably includes device logic 622 and mobile commerce system (MCS) logic 624. The device logic 622 may include state machine rule-sets for interacting with the native devices (portable electronic devices), while the MCS logic 624 may include state machine rule-sets for interacting with a mobile commerce system 200 and its components to complete the transaction. The device logic 622 provides the instructions for the self-contained business transaction capsule 600 to interface with the portable electronic device through a "container" (eContainer) 700 (see FIG. 7, to be discussed in greater detail below) and to perform certain tasks on the portable electronic device, such as: processing data; opening up a transmission port (e.g., a Bluetooth port); sending a data payload (e.g., completed transaction data) back to the mobile commerce system 200 or directly to a business or merchant; displaying data to the user on the display screen of the portable electronic device; and receiving input for selections and entries made by the user. In short, the device logic 622 includes all the necessary instructions for the eCapsule 600 to interact with and utilize the resources provided in a portable electronic device.

The MCS logic 624, on the other hand, provides instructions for the self-contained business transaction capsule 600 (or the completed transaction data to be transmitted to the mobile commerce system 200) to interface with the mobile commerce system 200 to complete the transaction. That is, once the user has "activated" the eCapsule 600 stored on the portable electronic device and has completed the transaction at his or her end, the entire eCapsule 600 carrying the information provided by the user may be transmitted to the mobile commerce system 200. In the alternative, only the completed transaction data may be transmitted (i.e., only the information that the mobile commerce system 200 does not already have required to complete the transaction), thus transmitting a smaller package and reducing the transmission time. These instructions of the MCS logic 624 may include, for example: assembling or submitting an order made by a customer, including the necessary information (such as name, address, shipping address, shipping type, payment information, product(s)/service(s) ordered, part numbers, etc.); and authenticating the origination portable electronic device to insure that the order was a legitimate order placed by an authorized user of the portable electronic device.

Figure 3:
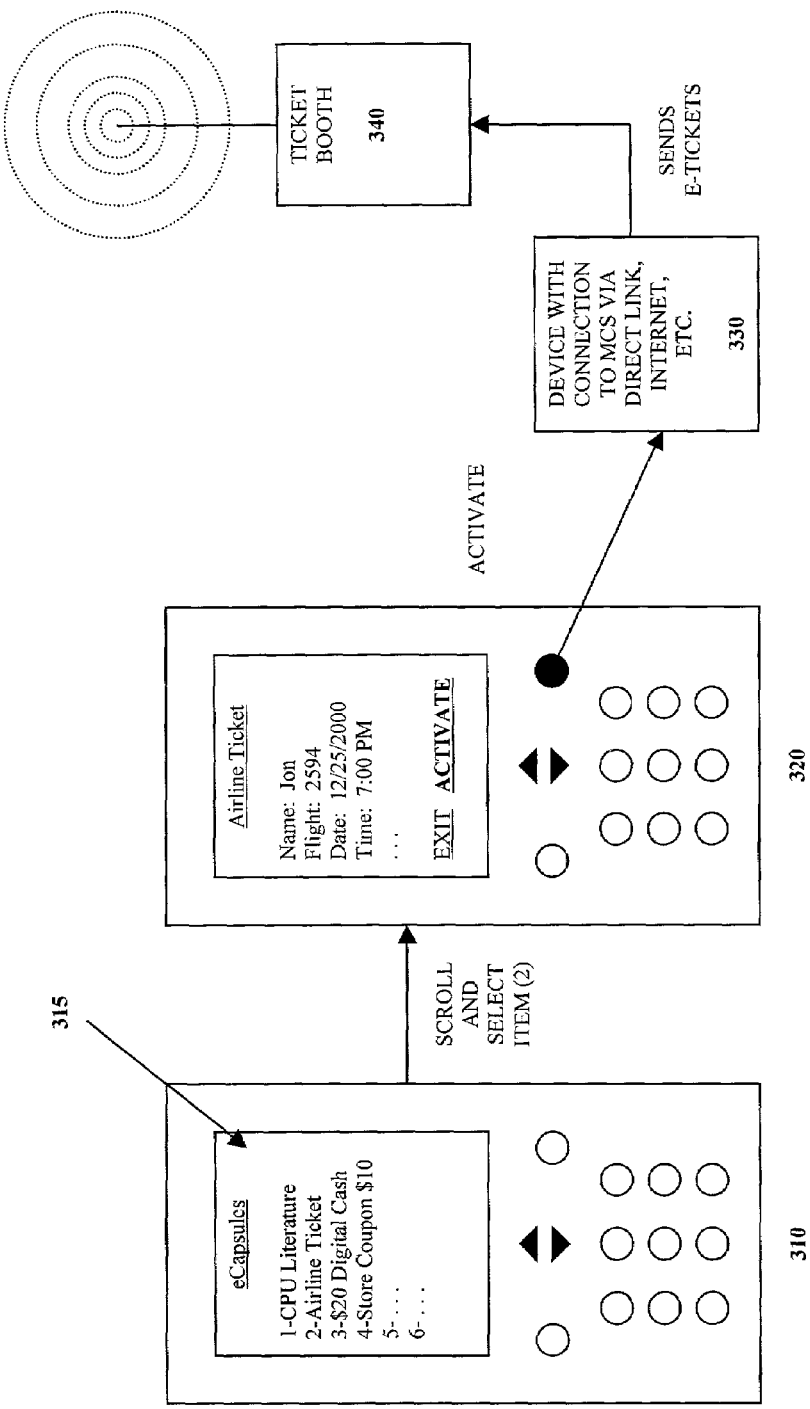
FIG. 3 illustrates an example of utilizing an airline ticket self-contained business transaction capsule according to an embodiment of the present invention.

FIG. 3 illustrates an example of utilizing an airline ticket self-contained business transaction capsule according to an embodiment of the present invention. The portable electronic device 310 may be a cellular telephone, personal digital assistant (PDA), or the like, capable of receiving, storing, and executing self-contained business transaction capsules 240, 242, 244, 246.

Figure 7:
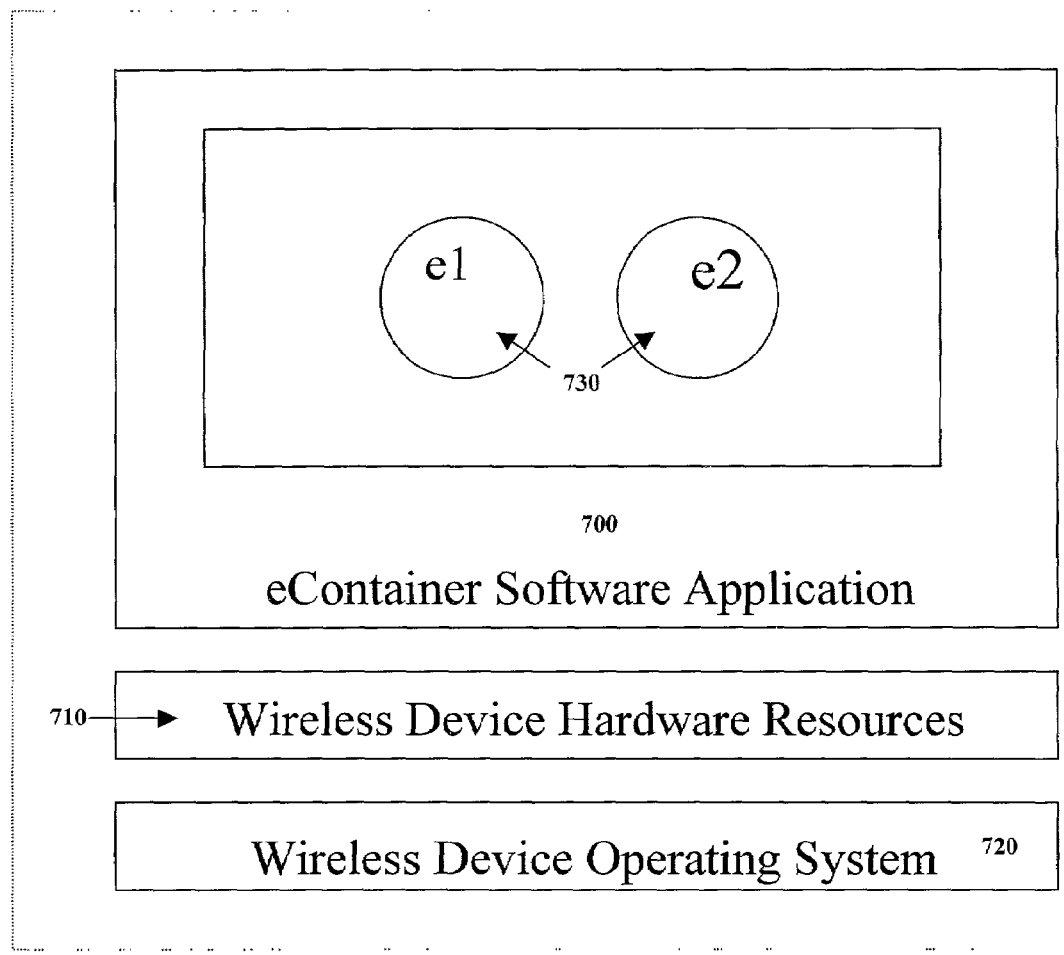
FIG. 7 illustrates a container for a self-contained business transaction capsule according to an embodiment of the present invention.

A container (eContainer) 315 may be provided to show the user a list of the self-contained business transaction capsules currently stored on the portable electronic device 310. The eContainer 315 is preferably a combination of software and hardware that provides a "habitat" in which an eCapsule may reside. A data storage medium (such as a semiconductor memory, hard disk, magnetic disk, optical disk, or any suitable electronic storage medium) is preferably provided within the portable electronic device 310 to store the software and eCapsules. As shown in FIG. 7, the eContainer 700 maintains the eCapsules 730 stored in the portable electronic device. The eContainer 700 is preferably a software shell, analogous to a UNIX shell, such as tcsh, csh, bash, etc. These shells create an abstract (or platform isolation) layer to the operating system 720 so that commands issued in the shell are platform and system independent, such as with UNIX shell scripting commands. These commands are processed by the shell to interact with the hardware resources 710 of the portable electronic device through the operating system 720.

Each portable electronic device typically has some sort of operating system 720. A very "light" shell is preferably developed for each type and brand of portable electronic device such that the state machine and rule sets in a self-contained business transaction capsule 730 may be properly executed by the portable electronic device. The eContainer 700 also preferably includes machine-readable (software) code that facilitates the receiving, transmitting, and tuning (to be discussed further below) functionalities of a portable electronic device.

By providing an eContainer 700, two types of implementations of the self-contained business transaction capsules 730 may be performed. With "strong" encapsulation, all logic code is contained inside an eCapsule, and therefore the eContainer 700 only needs to perform the basic functionalities of tuning, sending, receiving, and managing resident eCapsules 730. The machine code to communicate to the Bluetooth port, to dial a telephone number, etc., for example, is contained entirely within the eCapsules 730. With "weak" encapsulation, the eCapsule is a template, or a set of commands, with references to invocate business and transaction logic objects residing in the eContainer 700 and the mobile commerce system 200. The eContainer 700 "interprets" the eCapsule template during executing, much like a script executing in a UNIX shell. By placing most of the transaction and device specific logic in the eContainer 700 (rather than in the eCapsules 730), the eCapsules 730 may be individually light and shares the device and transaction codes in the eContainer 700. "Weak" encapsulation provides for a smaller eCapsule package, and cuts down on the amount of bytes transmitted during an eCapsule operation.

Referring back to FIG. 3, to activate the airline ticket eCapsule, the user chooses the second selection displayed on the portable electronic device 310 in the example illustrated in FIG. 3. By utilizing the mobile commerce system 200 (see FIG. 2) according to an embodiment of the present invention, airline ticket self-contained business transaction capsules may be generated by having the input transformer 230 review the entire Web site of an airline, and convert each flight listed on the airline Web site into an individual airline ticket self-contained business capsule. Each individual airline ticket eCapsule contains all the information for a user to easily reserve a seat and purchase a ticket for a specific flight on a specific day.

For example, a user wishing to travel from Los Angeles to New York on a specific day would be drawn or "pulled" to the airline's Web site in a conventional manner by entering the Web site using the portable electronic device 310, just like in the wired world. Once the user has logged onto the airline's Web site, the user is preferably provided a menu that can be easily navigated using the user's portable electronic device 310. For example, the mobile commerce system 200 may have a connection with the airline's Web site so as to detect the presence of the user's portable electronic device 310 (which may include the brand and model number, operating system and version, etc.) and serve the user a more simple menu as opposed to one provided for a wired Internet connection.

The user is able to search and review for a desired flight, and once that flight is found, the appropriate airline ticket self-contained business transaction capsule, containing all the flight information and transaction logic necessary to complete the transaction (i.e., book the flight and reserve a seat), is transmitted, preferably from the mobile commerce system 200 to the portable electronic device 310. However, the airline ticket eCapsule may be first transmitted to the airline computer system, which then transmits it to the user. This airline ticket eCapsule is stored in the portable electronic device 310, and is inactive until the user checks in for the flight.

Additionally, aside from "pulling" information from a Web site, a user may also talk to a telephone operator or automated telephone system to request certain flight information. When the desired flight information is located either via pulling from the Web site or talking to the operator, the user may pull a number of relevant flight eCapsules into his or her portable electronic device 310, or the telephone operator or system may "push" these eCapsules to the user's portable electronic device 310. Again, the user may scroll through the relevant flight eCapsules and purchase the desired one.

Once the user arrives at the airport and is ready to check in for the flight, the user calls up the airline ticket self-contained business transaction capsule, as illustrated by the portable electronic device 320 in FIG. 3. All the pertinent information is displayed, including the name of the passenger, the flight number, and the date and time of the flight. When the airline ticket eCapsule is first received by the portable electronic device, basic information, such as the user's name, address, credit card or billing information, may be pre-defined and pre-stored so that this basic information may be provided to the airline ticket eCapsule so that the user need not re-enter this information for each transaction performed.

At the boarding gate, for example, may be a wireless receiver, such as a "Bluetooth"-enabled receiver adapted to receive the airline ticket self-contained business transaction capsule stored on the portable electronic device 320. Bluetooth is a wireless networking protocol that utilizes short-range radio waves to connect electronic devices together without using wires, and is operable at distances up to 33 feet (Bluetooth Specification v.1.0B, from the Bluetooth Special Interest Group). Therefore, the user can simply point his or her portable electronic device 320 to the Bluetooth-enabled boarding gate and activate the airline ticket eCapsule for that specific flight to check in and board the aircraft. Completed transaction data, provided when the user activates 320 the airline ticket eCapsule, is transmitted via the Bluetooth protocol from the portable electronic device 320 to the wireless Bluetooth receiver at the boarding gate.

Preferably, once the Bluetooth-enabled boarding gate receives the completed transaction data, the information may be passed on to the airline's computer to make the suitable seating arrangements, passenger confirmation, etc., as typically would be performed when a passenger checks in for a flight with a human attendant. The completed transaction data may be transmitted to a device 330 having a connection to the mobile commerce system 200, which handles the transaction requirements to complete the transaction. Once the transaction has been processed at the mobile commerce system 200, preferably utilizing the transactor 270 discussed above, data is transmitted to the airline to indicate that the transaction has been completed, and that the user may be issued a boarding pass to board the plane. The mobile commerce system 200 can then alert the ticket booth 340 to issue a paper boarding pass, or transmit an electronic boarding pass, such as another self-contained business transaction capsule via the ticket booth 340, so that the user can activate it to board the aircraft. When the user activates the airline ticket eCapsule, the device 330 may communicate with the mobile commerce system 200, and more specifically the transactor 270, to perform certain "ticket redemption transaction services", such as authenticating the portable electronic device utilized, checking for a valid ticket (e.g., not lost, stolen, etc.), and replacing the airline ticket eCapsule with a boarding pass eCapsule once the user has been confirmed for the flight.

The device 330 may communicate with the mobile commerce system 200 by, for example: (1) direct dialing the mobile commerce system 200 (e.g., 1-800-WARP9MCS) via a conventional wireless telephone protocol; (2) utilizing Short Messaging Service (SMS); or (3) via Transmission Control Protocol/Internet Protocol (TCP/IP) if there is an "always on" Internet connection.

Alternatively, the completed transaction data may be transmitted directly to a ticket booth 340 from the portable electronic device 320, where all the necessary transaction processing occurs (passenger confirmation, passenger seating, etc.) and a paper boarding pass or an electronic boarding pass may be issued to the user. The ticket booth 340 could then relay the completed transaction data to the mobile commerce system 200 so as to indicate that the transaction involving a particular self-contained business transaction capsule has been completed for a particular user.

Stored self-contained business transaction capsules may be unique to individual users. A personal password may be provided to allow a user access to any of his or her unique eCapsules. In the event that the user's portable electronic device 320 is lost, misplaced, stolen, or substituted, he or she can retrieve the eCapsules from the mobile commerce system 200 through any Internet connected device. That is, the mobile commerce system 200 preferably keeps a backup of all the eCapsules a user has stored on his or her portable electronic device 320. Therefore, the user simply needs to log onto the mobile commerce system 200, provide the correct identifying information (user name) and password, and the mobile commerce system 200 can cancel the stored eCapsules on the old portable electronic device, and broadcast replacement ones to the user's new portable electronic device.

In further embodiments of the airline ticket self-contained business transaction capsule scenario, after arriving at John F. Kennedy airport in New York, the user could be easily "located" using GPS or Global System for Mobile Communications (GSM) tracking devices, wherein the portable electronic device has a GPS or GSM system. Based on the location of the user, the airline could "push" or broadcast a self-contained business transaction capsule to the user containing all information necessary to reserve a room at the New York Hilton. The airline could also "push" or broadcast an eCapsule to the user containing all information necessary to purchase a ticket to the Lakers-Knicks game, scheduled for tip-off in two hours. This basketball game ticket could be issued in electronic form, packed within an eCapsule, to be stored on the user's portable electronic device and presented to a Bluetooth-enabled electronic gate at Madison Square Garden.

In another scenario according to an embodiment of the present invention, self-contained business transaction capsules may be utilized to advertise and sell products at a trade show. Large businesses and corporations offer thousands of products in the marketplace. Many of these products are usually supported with a substantial amount of expensive product and technical literature. It is a major undertaking for a large corporation to distribute the appropriate product literature to interested visitors at a large trade show, such as at the annual COMDEX convention in Las Vegas. This process can be very inefficient and inconvenient for both the exhibitors and visitors. To solve this problem, a self-contained business transaction capsule may be created by the mobile commerce system 200 for each product being displayed at the trade show.

For example, if a company wished to promote its new line of microprocessors at a trade show such as COMDEX, the company could broadcast self-contained business transaction capsules, similar to the "product" capsules 240 discussed above, from its booth utilizing a wireless transmission device, such as a Bluetooth-enabled transmitter. These eCapsules may contain data about the new line of microprocessors, technical specifications, images, and any special offers. Therefore, if a user walks within 33 feet of a Bluetooth-enabled booth, the user could be prompted to receive eCapsules containing information about all the products and/or services being offered at that booth. The eCapsules may be transmitted to and stored on the portable electronic device for immediate viewing, or at a later time, much like that of someone picking up a brochure about a product or service at a trade show.

Figure 4:
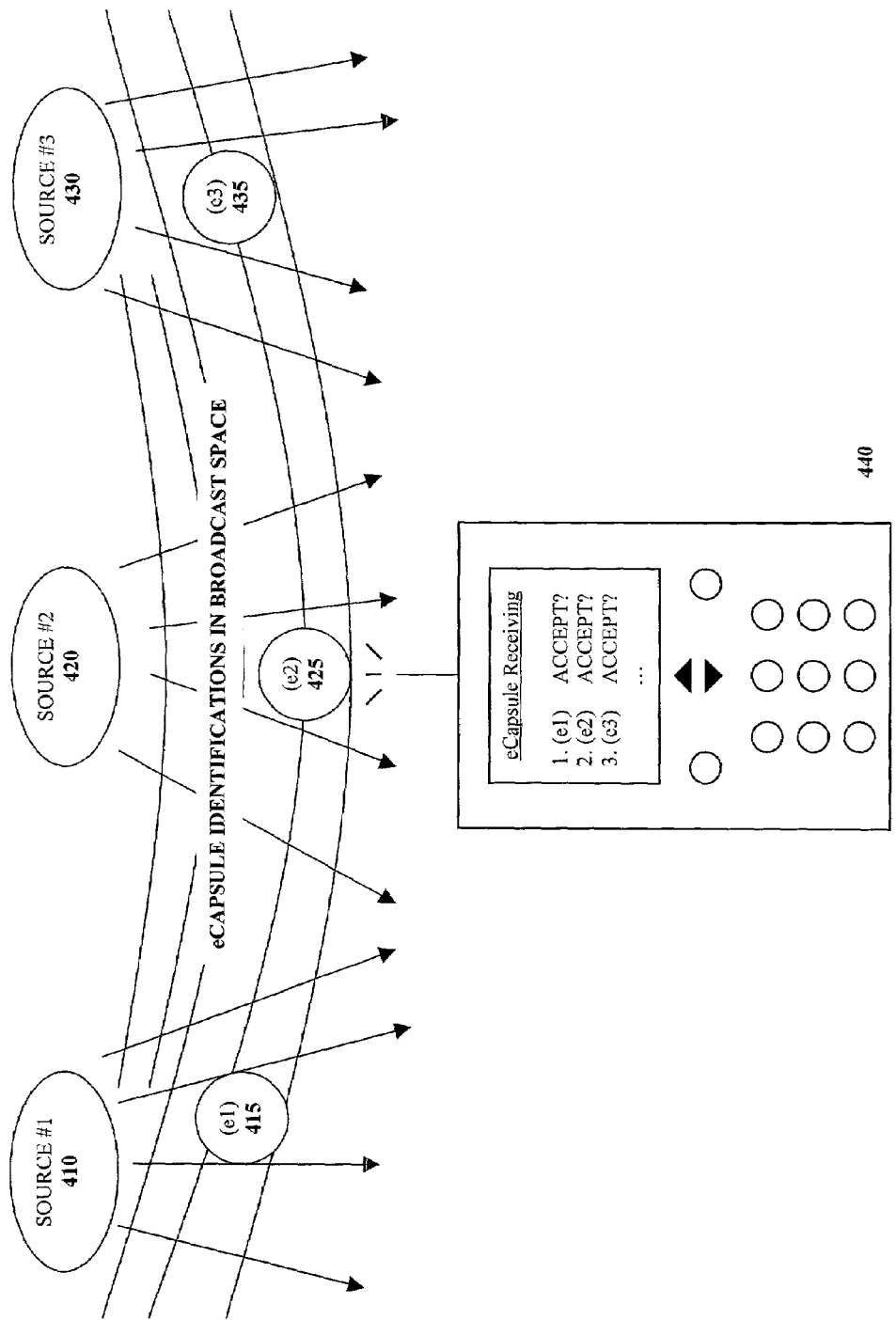
FIG. 4 illustrates self-contained business transaction capsule identifications being transmitted in broadcast space according to an embodiment of the present invention.

FIG. 4 illustrates self-contained business transaction capsule identifications being transmitted in broadcast space according to an embodiment of the present invention. Accordingly, the Bluetooth-enabled booths 410, 420, 430 preferably are not constantly broadcasting the actual self-contained business transaction capsules out in the broadcast space, but instead, only the identifications of them. Accordingly, as a user passes through the broadcast space of a source 410, 420, 430, the user's portable electronic device 440 picks up the identifications 415, 425, 435 of the eCapsules being offered by each source (booth) 410, 420, 430, and the user is prompted to accept them or not, as shown by the portable electronic device 440. The identifications 415, 425, 435 preferably include a short name or title as to the contents of an eCapsule being offered, such as "Flight 2594 Reservation", or "800 MHz CPU", etc. If the user chooses to accept a particular eCapsule based on the broadcasted identifications 415, 425, 435, the portable electronic device 440 initiates an "accept" signal for that particular eCapsule, which is received by the appropriate source (booth) 410, 420, 430. The requested eCapsule is broadcasted over the broadcast space, and received and stored by the portable electronic device 440.

Figure 5:
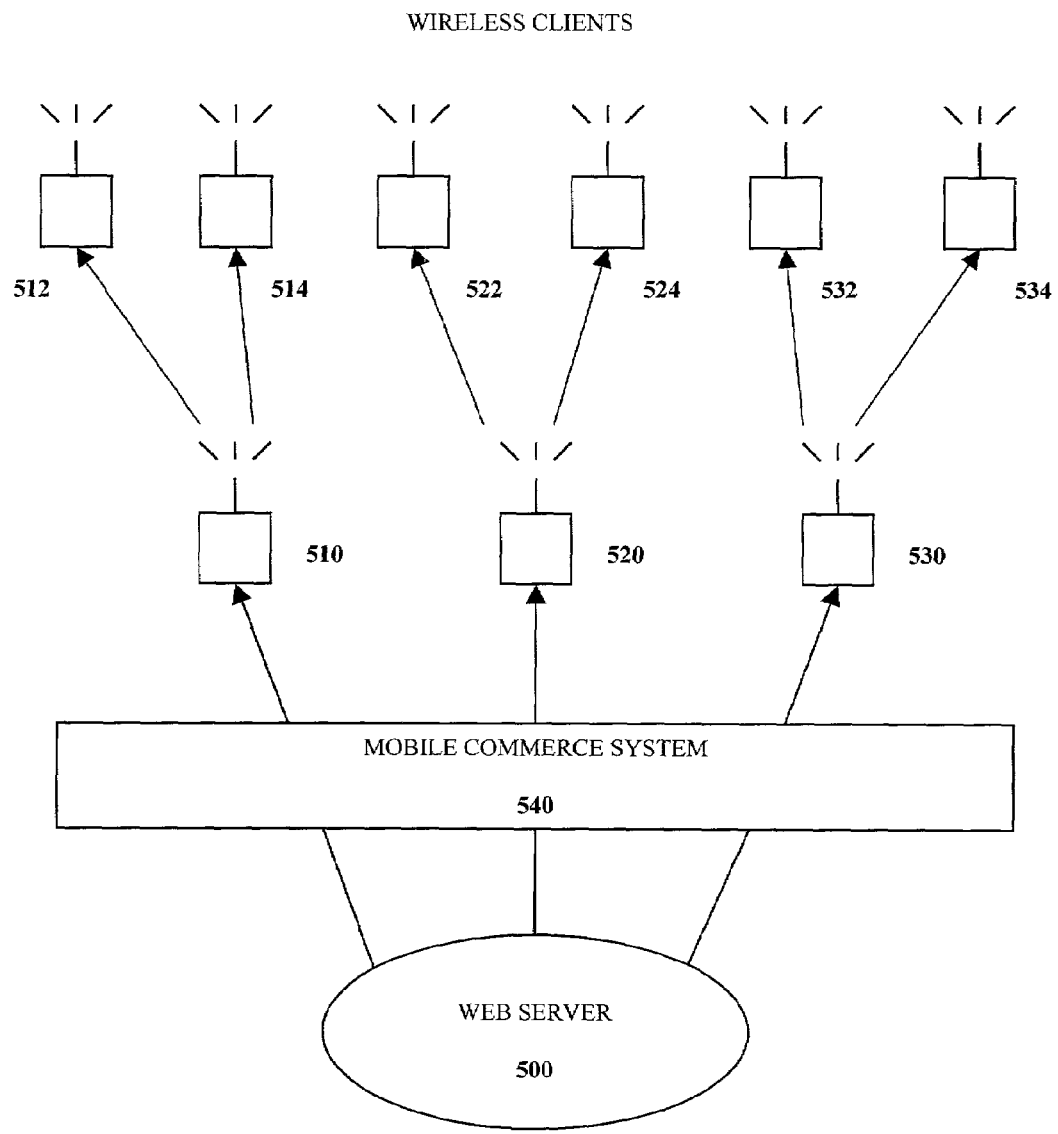
FIG. 5 illustrates a distributed wireless client/server architecture according to an embodiment of the present invention.

After the user reviews the information contained in a self-contained business transaction capsule received from a booth (which may be many days or weeks after the trade show), the transaction logic stored therein enables the user to provide his or her contact information to the exhibitor to order the product, obtain further information, etc. Moreover, the user could also send "copies" of the eCapsule received at the trade show to another user, by having the user transmit or "beam" the eCapsule directly to another portable electronic device, or even to a wired device having a wireless receiver. As illustrated in FIG. 5, the self-contained business transaction capsules according to an embodiment of the present invention can facilitate a "viral" effect. A single eCapsule may be "replicated" by transmitting it to a number of portable electronic devices 512, 514, 522, 524, 532, 534 from portable electronic devices 510, 520, 530 that have already received the eCapsule from a source, such as a mobile commerce system 540, which may ultimately receive the relevant data from a Web server 500. That is, eCapsules that are not personal to a particular user may be readily transmitted from one portable electronic device to another.

Figure 1:
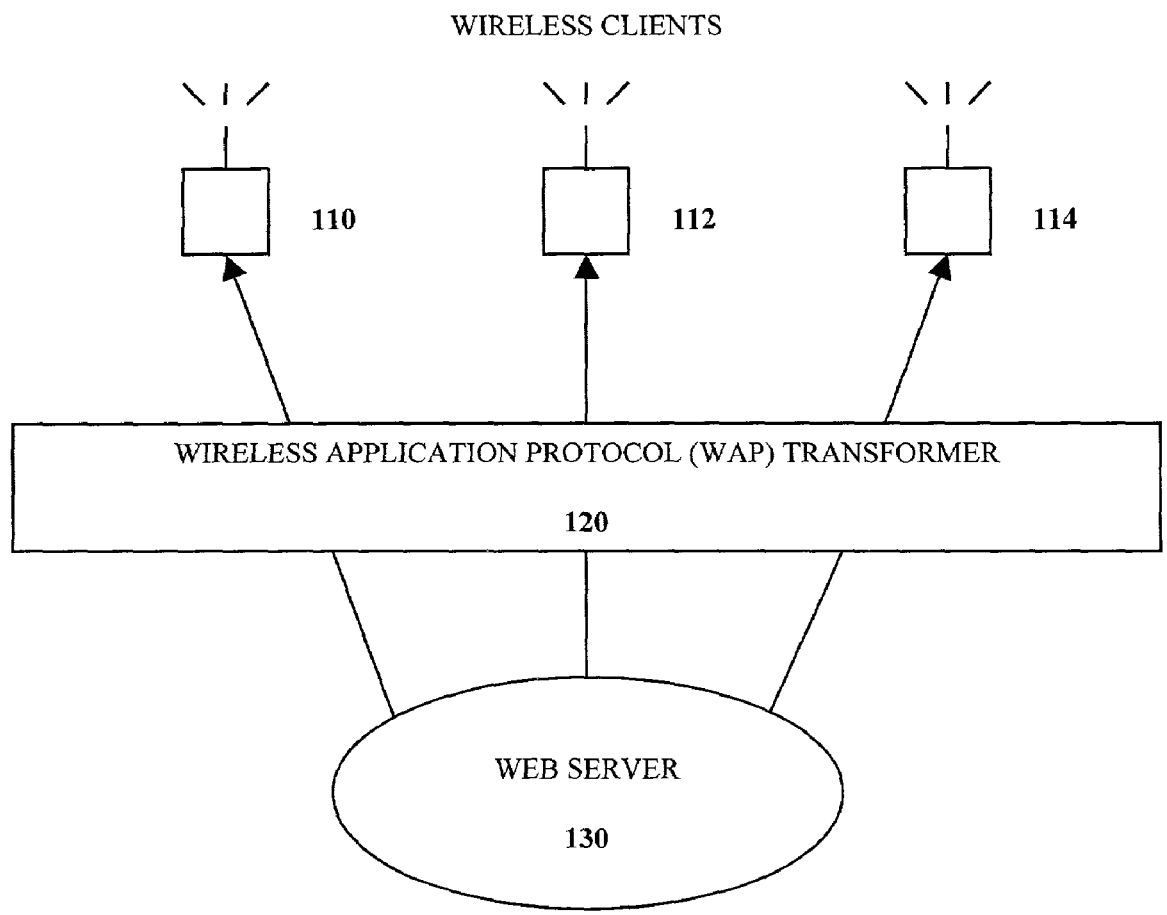
FIG. 1 illustrates a wireless client/server architecture according to the prior art.

The distributed wireless client/server model as illustrated in FIG. 5 is in contrast to the prior art wireless client/server model, as illustrated in FIG. 1, where information is transmitted only point-to-point from the source (e.g., Web server) 130, via a transformer 120 such as a WAP transformer, to the wireless clients 110, 112, 114. However, with the distributed wireless client/server model according to an embodiment of the present invention, the "viral" effect as illustrated in FIG. 5 is achieved as each self-contained business transaction capsule may be readily transmitted from one wireless client to another because all of the necessary information to complete a transaction is stored within each eCapsule.

The viral effect may be further illustrated with a scenario involving a "discount coupon" self-contained business transaction capsule. Large apparel manufacturers and retail chains spend enormous sums of money advertising their products to target segments of their markets. Their challenge is to turn prospects into buyers. For example, the mobile commerce system 200 could create an eCapsule for each product offered by a retail chain.

If the retail chain wished to promote its brand-name jeans, for example, the "Classic Fit Jeans" to teenage girls, the retail chain could mention a money saving coupon in its television commercial targeted at the market segment. Then, a television viewer with a Bluetooth-enabled set top box, or any other suitable transmitter/receiver, could use a portable electronic device to receive a self-contained business transaction capsule containing a digital discount coupon. The coupon could be time-stamped to be good only for a specific period of time, for example, within 48 hours, or one month's time, etc. The coupon eCapsule could have data that includes the amount to be discount (e.g., $10 off), what items are eligible (e.g., "Classic Fit Jeans"), and an expiration date. Accordingly, the coupon eCapsule is stored within the portable electronic device, and remains inactive until the user goes shopping.

The original user having the coupon self-contained business transaction capsule can meet a friend and transmit or "beam" this coupon eCapsule to a friend(s). The friend(s) can further transmit or "beam" this coupon eCapsule directly from one portable electronic device to another, as illustrated in FIG. 5. Therefore, this single couple eCapsule may be further transmitted to hundreds or thousands of users amongst each other, without any interaction with the mobile commerce system 540 or the Web server 500. So, if the user goes to the store and selects a pair of "Classic Fit Jeans", the user can redeem the digital discount coupon by "activating" the coupon eCapsule stored on the portable electronic device, and the transaction logic will transmit any required information (e.g., the name of the user, the amount of the discount, and any other statistical information for the retail chain) in the form of completed transaction data, and the cash register, preferably utilizing Bluetooth or any other wireless transmission protocol, could receive the completed transaction data and deduct the discount off of the retail price.

In a further embodiment of the present invention, the broadcast of capsule identifications are not confined to that of an indoor area, like that of a convention center or a store, but, may be broadcast out in the open, similar to that of a radio station. Because the Bluetooth wireless networking protocol is limited to a range of about 33 feet from its broadcast source, other short-to-medium range wireless transmission protocols are preferably utilized so as to broadcast at a greater range. A tuner may be provided with the user's portable electronic device, similar to that of a dial on a radio or a channel selector on a television set, where the user may tune into the broadcast of specific types of self-contained business transaction capsules in which the user is interested. The tuner is preferably a part of the software code of the eContainer 700 (see FIG. 7), discussed above, that is adapted to utilize the wireless receiver of the portable electronic device to "tune into" particular eCapsule identifications. That is, the tuner is preferably adapted to tune into the eCapsule identifications 415, 425, 435 (see FIG. 4) of a particular type or category of eCapsule in which the user is interested.

For example, the user may be driving through downtown at lunch time, and seeks to find a restaurant and place a reservation. The user may "tune" his or her portable electronic device 440 to the category of "Restaurants", to receive eCapsule identifications of restaurants in the area. The eCapsule identifications may be all broadcast under a common protocol or frequency, of which the tuner identifies the relevant capsule identifications (such as those having the word "restaurant" in their name or title) from all of the eCapsule identifications being broadcasted, and presents the relevant ones to the user. An alternative broadcast scheme may involve the use of different frequencies, codes, time-domains, or spectrums that may be isolated for each type or category of product or service available, of which only the eCapsule identifications of a same type or category (such as "restaurants", "cars", etc.) are broadcast along the same allotted frequency, code, time-domain, or spectrum. The categories may even be more specific, such as "Italian restaurants", and the tuner is adapted to only present the "Italian restaurant" eCapsule identifications for the user to review and select.

Accordingly, the user may select from a variety of "restaurant" self-contained business transaction capsules by requesting them to be broadcasted, based on the eCapsule identifications received. Once the restaurant eCapsules have been received by the portable electronic device, the user can review information about the restaurant, such as the menu, prices, critic/customer reviews, hours, reservation availability, etc. If the user finds an available restaurant that he or she is interested in making a reservation, the user can "accept" or "activate" the eCapsule for that restaurant, and the transaction logic for that eCapsule will gather the necessary information, such as the user's name, (cellular) telephone number, the time for the reservation, number in the party, etc., and transmit it to the restaurant to make the reservation, either directly to the restaurant's wireless receiver, or to a mobile commerce system 200, which ultimately relays the data to the restaurant.

Accordingly, eCapsule identifications, and the self-contained business transaction capsules themselves, may be broadcasted by a restaurant in its immediate area, for example, a 3-mile radius; and only when the user is within the broadcast area will the user be presented with the eCapsule identifications. An alternative broadcast scheme is to utilize a global positioning system (GPS) along with the portable electronic device, so that the user can request eCapsule identifications of restaurants in his or her current immediate area, and a host system, such as a mobile commerce system 200, could detect the user's present location, and broadcast the eCapsule identifications of the restaurants within the user's current immediate area. And, the eCapsule identifications may be constantly updated as the user travels, and the user may pre-select an area (like a 3-mile radius) from which to receive the capsule identification of the restaurants.

In yet another embodiment of the present invention, "digital cash" self-contained business capsules may be implemented as well, conforming to any set standard format for digital or electronic cash. After providing a user name and password, a bank customer can receive a digital cash eCapsule containing a requested amount of digital cash, similar to accessing an automated teller machine (ATM). In fact, the user can obtain the digital cash eCapsule by utilizing a Bluetooth-enabled ATM, or simply off of the wireless Internet network. The digital cash eCapsule is stored in the portable electronic device of the bank customer, and remains inactive until the bank customer wishes to make a purchase. The digital cash eCapsule preferably contains information including the amount of cash remaining, and identification of the rightful owner. For example, the user may be at a soda vending machine, and wishes to purchase a can of root beer from the Bluetooth-enabled vending machine. The user could pay for the soda by "activating" the digital cash eCapsule, indicating the amount the user wishes to transmit, then transmit or "beam" the completed transaction data (the digital cash) from the digital cash eCapsule to the vending machine. The transaction logic in the digital cash eCapsule prepares the complete transaction data, such as sending the correct amount of currency, and deducting the amount from the balance for that digital cash eCapsule stored on the portable electronic device.

In the event that the user's portable electronic device is lost, misplaced, stolen, or substituted, the user can simply contact the mobile commerce system 200, via for example, a new portable electronic device, to provide the user's identification and password, and cancel all the eCapsules stored on the old portable electronic device, including the digital cash eCapsule, and broadcast replacement eCapsules to the user's new portable electronic device.

The self-contained business transaction capsule also facilitates distributed enterprise computing. For example, a "smart order" transaction made by a user may be packaged within an eCapsule containing the content of the order and transaction logic to process the order. The transaction logic may include instructions to communicate to a plurality of systems in order to complete the transaction. That is, the transaction logic may include instructions to provide order information to an order fulfillment system, to receive payment approval status information, to receive out of stock information, to provide order information to a warehouse system for packaging of the ordered product, to receive updated shipping tracking information (including in-transit status) from a courier, to send e-mail messages to the relevant users and systems during the various stages of the transaction as required (e.g., status updates), and to update the master database system (such as the mobile commerce system 200) of transaction status and completion. Therefore, the eCapsule may be configured so as to handle communications with a number of systems, each separately processing data received from the eCapsule, in order to complete the transaction.

The self-contained business transaction capsule according to an embodiment of the present invention accelerates the growth and adoption of mobile wireless computing and commerce. By utilizing a self-contained business transaction capsule, a business can "push" or broadcast product and service offers to wireless users to conduct transactions on-the-go, or "store" a transaction to be completed in the future. Conventional wireless systems are mainly "pull" based, having very limited push capabilities. However, the self-contained business transaction capsule may also be obtained by first "pulling" a customer to a Web site, as with conventional wired Web sites. The eCapsules may be broadcasted anywhere and anytime via wireless transmission protocols to wireless devices, such as cellular telephones or personal digital assistant (PDAs), to complete wireless transactions anywhere and anytime. This solution provides businesses and wireless users maximum flexibility in conducting m-commerce transactions.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A self-contained business transaction capsule, comprising:
   a machine readable storage medium, the machine-readable storage medium including transaction data, the transaction data including data regarding transaction products, transaction services, and transaction participants;
   machine readable program code, stored on the machine-readable storage medium, the machine readable program code having instructions, which when executed cause a wireless communicating electronic device to:
   initiate interaction between the transaction participants and the self-contained business transaction capsule by receiving input regarding a business transaction;
   modify the transaction data, by receiving input, to create modified transaction data; and
   transfer the entire self-contained business transaction capsule, which includes the transaction data, the modified transaction data, and the machine-readable program code, from the wireless communicating electronics device to another transaction particioant's wireless electronics devices utilizing wireless communications.

2. The self-contained business transaction capsule, according to claim 1 including instructions, which when executed cause the wireless communicating electronic device to copy the self-contained business transaction capsule to one of the transaction participants.

3. The self-contained business transaction capsule according to claim 1 including instructions, which when executed cause the wireless communicating electronic device to access functionality with other wireless devices utilizing a peer-to-peer topology for data transmission.

4. The self-contained business transaction capsule according to claim 1, including instructions, which when executed cause the wireless communicating electronic device to access functionality with other wireless devices utilizing a peer-to-peer topology for transmission of the entire self-contained business transaction capsule.

5. The self-contained business transaction capsule according to claim 1 including instructions, which when executed cause the wireless communicating electronic device to access functionality in a remote mobile commerce system for order processing, payment processing, or messaging utilizing a client-server topology for data transmission.

6. The self-contained business transaction capsule according to claim 1, including instructions, which when executed cause the wireless communicating electronic device to access functionality in remote commerce systems for order processing, payment processing, or messaging utilizing a client-server topology for transmission of the entire self-contained business transaction capsule from the wireless communicating electronic device to one of the remote mobile commerce systems.

7. The self-contained business transaction capsule according to claim 1, wherein the self-contained business transaction capsule automatically activates once a certain event occurs.

8. The self-contained business transaction capsule according to claim 7, wherein the event to automatically activate the self-contained business transaction capsule is arriving in a geographical area where a wireless networking protocol that utilizes short-range radio waves is operating.

9. The self-contained business transaction capsule according to claim 7, wherein the event to automatically activate the self-contained business transaction capsule is arriving in a geographical area where a device is broadcasting other self-contained business transaction capsules.

10. The self-contained business transaction capsule of claim 1, wherein the machine executable program code includes a state machine ruleset for interacting with the wireless electronic device.

11. The self-contained business transaction capsule of claim 1, wherein the machine executable program code includes a state machine ruleset for interacting with a mobile commerce system.

12. A method of conducting a business transaction utilizing a self-contained business transaction capsule, the method comprising:
   providing a machine-readable storage medium including the self-contained business transaction capsule, the self-contained business transaction capsule having transaction data, the transaction data including data regarding transaction products, transaction services, and transaction participants; and
   providing machine-readable program code, stored on the machine-readable storage medium, the machine-readable program code also included in the self-contained business transaction capsule, and the machine-readable program code having instructions, which when executed cause a wireless communicating electronic device to:
   initiate interaction between the transaction participants and the self-contained business transaction capsule;
   modify the transection data, by receiving input, to create modified transaction data;
   transfer the entire self-contained business transaction capsule, which includes the transaction data, the modified transaction data, and the machine-readable program code, from the wireless communicating electronic device to another transaction participant's wireless electronic devices utilizing wireless communications.

13. The method according to claim 12, including instructions, which when executed cause the wireless communicating electronic device to copy the self-contained business transaction capsule to one of the transaction participants.

14. The method according to claim 12, including instructions, which when executed cause the wireless communicating electronic device to access functionality with other wireless devices utilizing a peer-to-peer topology for data transmission.

15. The method according to claim 12, including instructions, which when executed cause the wireless communicating electronic device to access functionality with other wireless devices utilizing a peer-to-peer topology for transmission of the entire self-contained business transaction capsule.

16. The method according to claim 12, including instructions, which when executed cause the wireless communicating electronic device to access functionality in a remote mobile commerce system for order processing, payment processing, or messaging utilizing a client-server topology for data transmission.

17. The method according to claim 12, including instructions, which when executed cause the wireless communicating electronic device to access functionality in remote commerce systems for order processing, payment processing, or messaging utilizing a client-server topology for transmission of the entire self-contained business transaction capsule from the wireless communicating electronic device to one of the remote mobile commerce systems.

18. The method according to claim 12, wherein the self-contained business transaction capsule automatically activates once a certain event occurs.

19. The method according to claim 18, wherein the event to automatically activate the self-contained business transaction capsule is arriving in an area where a wireless networking protocol that utilizes short-range radio waves is operating.

20. The method according to claim 18, wherein the event to automatically activate the self-contained business transaction capsule is arriving in an area where a device is broadcasting other self-contained business transaction capsules.

21. A self-contained business transaction capsule, comprising:
a machine readable storage medium, the machine-readable storage medium including transaction data, the transaction data including data regarding transaction products, transaction services, and transaction participants;
machine readable program code, stored on the machine-readable storage medium, the machine readable program code having instructions, which when executed cause a wireless communicating electronic device to:
initiate interaction between the transaction participants and the self-contained business transaction capsule by receiving input regarding a business transaction;
add additional information to the transaction data, by receiving input, to create additional transaction data; and
transfer of the entire self-contained business transaction capsule, which includes the transaction data, the additional transaction data, and the machine-readable program code, from the wireless communicating electronics device to another transaction participant's wireless electronics devices utilizing wireless communications.

22. A self-contained business transaction capsule for utilization In an wireless airline ticket application, comprising:
a machine-readable storage medium, the machine readable storage medium including airline transaction data, the airline transaction data including a flight number, a date of a flight and a time of a flight;
machine-readable program code, stored on the machine-readable storage medium, the machine readable program code having instructions, which when executed causes a wireless communicating electronic device to:
initiate a display of the airline transaction data on a display of the wireless electronic device by receiving input from a user;
add to the airline transaction data by receiving user personal information, such as name, address, or billing information, in order to create additional airline transaction data; and
transfer the entire self-contained business transaction capsule, which includes the airline transaction data, the additional airline transaction data and the machine readable program code, from the wireless communicating electronic device to an airline mobile commerce system utilizing wireless communications.

23. The self-contained business transaction capsule according to claim 22 including instructions, which when executed cause the wireless communicating electronic device to access functionality with other wireless devices utilizing a peer-to-peer topology for data transmission.

24. The self-contained business transaction capsule according to claim 22, including instructions, which when executed cause the wireless communicating electronic device to access functionality with other wireless devices utilizing a peer-to-peer topology for transmission of the entire self-contained business transaction capsule.

25. The self-contained business transaction capsule according to claim 22, including instructions, which when executed cause the wireless communicating electronic device to access functionality in a remote mobile commerce system for order processing, payment processing, or messaging utilizing a client-server topology for data transmission.

26. A self-contained business transaction capsule for utilization in a wireless trade show literature application, comprising:
a machine-readable storage medium, the machine readable storage medium including product data, the product data including technical specification of a product and an image of the product;
machine-readable program code, stored on the machine-readable storage medium, the machine readable program code having Instructions, which when executed causes a wireless communicating electronic device to:
initiate a display of the product data on a display of the wireless electronic device after receiving input from a user;
create additional product data by adding contact information to the product data after receiving input from the user; and
transfer the entire self-contained business transaction capsule, which includes the product data, the additional product data and the machine readable program code, from the wireless communicating electronic device to a product booth at the trade show utilizing wireless communications.

27. The self-contained business transaction capsule according to claim 26 including instructions, which when executed cause the wireless communicating electronic device to access functionality with other wireless devices utilizing a peer-to-peer topology for data transmission.

28. The self-contained business transaction capsule according to claim 26, including instructions, which when executed cause the wireless communicating electronic device to access functionality with other wireless devices utilizing a peer-to-peer topology for transmission of the entire self-contained business transaction capsule.

29. The self-contained business transaction capsule according to claim 26, including instructions, which when executed cause the wireless communicating electronic device to access functionality in a remote mobile commerce system for order processing, payment processing, or messaging utilizing a client-server topology for data transmission.

30. A self-contained business transaction capsule for utilization in a wireless restaurant reservation application, comprising:
- a machine-readable storage medium, the machine readable storage medium including restaurant data, the restaurant data including a menu, prices, reviews, and reservation information;
- machine-readable program code, stored on the machine-readable storage medium, the machine readable program code having instructions, which when executed causes a wireless communicating electronic device to:
- initiate a display of the restaurant data on a display of the wireless electronic device after receiving input from a user.
- create modified restaurant data after receiving data input from the user, the data input including a customer name, a contact number, a time for a reservation, and a number of people for the reservation which modifies the reservation information; and
- transfer the entire self-contained business transaction capsule, which includes the restaurant data, the modified restaurant data and the machine readable program code, from the wireless communicating electronic device to a restaurant mobile commerce system utilizing wireless communications.

31. The self-contained business transaction capsule of claim 30, wherein the transfer utilizes instructions from the machine-readable code of the self-contained business transaction capsule to initiate the transfer and does not utilize external utilities of an operating system of the wireless communicating electronic device to initiate the transfer.

32. The self-contained business transaction capsule according to claim 30 including instructions, which when executed cause the wireless communicating electronic device to access functionality with other wireless devices utilizing a peer-to-peer topology for data transmission.

33. The self-contained business transaction capsule according to claim 30, including instructions, which when executed cause the wireless communicating electronic device to access functionality with other wireless devices utilizing a peer-to-peer topology for transmission of the entire self-contained business transaction capsule.

34. The self-contained business transaction capsule according to claim 30, including instructions, which when executed cause the wireless communicating electronic device to access functionality in a remote mobile commerce system for order processing, payment processing, or messaging utilizing a client-server topology for data transmission.

35. A self-contained business transaction capsule, comprising:
- a machine readable storage medium, the machine-readable storage medium including transaction data, the transaction data including data regarding transaction products, transaction services, and transaction participants;
- machine readable program code, stored on the machine-readable storage medium, the machine readable program code having instructions, which when executed cause a wireless communicating electronic device to:
- initiate interaction between the transaction participants and the self-contained business transaction capsule by receiving input regarding a business transaction;
- modify the transaction data, by receiving input, to create modified transaction data; and
- operate on the transaction data and the modified transaction data included in the self-contained business transaction capsule to copy the entire self-contained business transaction capsule, which includes the transaction data, the modified transaction data, and the machine-readable program code, from the wireless communicating electronics device to another transaction participant's wireless electronics devices utilizing wireless communications.

* * * * *